United States Patent [19]
Boesel

[11] 3,955,271
[45] May 11, 1976

[54] DYNAMOELECTRIC MACHINERY

[75] Inventor: Walter F. Boesel, Palos Verdes Estates, Calif.

[73] Assignee: The Garrett Corporation, Los Angeles, Calif.

[22] Filed: Jan. 7, 1975

[21] Appl. No.: 539,194

Related U.S. Application Data

[62] Division of Ser. No. 509,977, Sept. 27, 1974, Pat. No. 3,885,302, which is a division of Ser. No. 383,174, July 27, 1973, Pat. No. 3,859,549.

[52] U.S. Cl. .................................. 29/596; 310/43; 310/214
[51] Int. Cl.² ...................................... H02K 15/06
[58] Field of Search ..................... 29/596, 609, 606; 310/186, 214, 208, 42, 43, 218

[56] References Cited
UNITED STATES PATENTS

| | | | |
|---|---|---|---|
| 1,053,680 | 2/1913 | Torda | 310/224 |
| 1,827,571 | 10/1931 | Fiene | 310/43 |
| 2,679,607 | 5/1954 | Potter | 310/218 |
| 2,749,456 | 6/1956 | Luenberger | 310/43 |
| 3,437,858 | 4/1969 | White | 310/214 |
| 3,468,019 | 9/1969 | Brown et al. | 310/214 |

FOREIGN PATENTS OR APPLICATIONS

| | | | |
|---|---|---|---|
| 1,120,444 | 7/1968 | United Kingdom | 310/214 |

*Primary Examiner*—Carl E. Hall
*Attorney, Agent, or Firm*—Albert J. Miller; Joel D. Talcott

[57] ABSTRACT

A dynamoelectric machine including stator and armature structures. The stator includes a yoke and a plurality of pole shoes carried thereby which include slots for receiving compensating coils. Strand-like elements are tightly packed within the slots between the compensating coils and the slot walls and are embedded within a hardened binder material, to support the coils against oscillation. Each pole shoe includes tip and base sections defining a pole face. The tip section comprises a plurality of lamination plates which have aligned apertures defining an opening extending through the tip section remote from the pole face. A connecting bar is disposed within this opening and has fastener elements mounted on each end thereof to clamp the lamination plates together. Threaded bolts are received in the connecting bar to draw the lamination plates toward the base section in uniform fashion. The yoke comprises a plurality of lamination plates which are arranged in mutually abutting relationship. A plurality of attachment flanges are welded across the outer edges of yoke plates to couple the plates together. The shoe base section is detachably secured to the yoke such that shoulder portions of the base section serve to clamp primary current windings in place against the yoke.

2 Claims, 6 Drawing Figures

DYNAMOELECTRIC MACHINERY

This is a division of application Ser. No. 509,977 filed Sept. 27, 1974 now U.S. Pat. No. 3,885,302 which is a division of application Ser. No. 383,174, filed July 27, 1973 now U.S. Pat. No. 3,859,549.

BACKGROUND AND OBJECTS OF THE INVENTIONS

This invention relates to dynamoelectric machines such as electric motors and generators.

In dynamoelectric machines having a commutating armature there is always present the problem of a cross-magnetizing field in the armature created by the load current therein. This problem is of little consequence in smaller machines, but when the machine size becomes greater than a few horsepower, and when maximum overload and broadest speed range are desired, it is advantageous to provide the machine with compensating windings coupled in series ith the armature. This tends to neutralize the cross-magnetization to the extent possible.

Problems occur in attempting to adapt a dynamoelectric machine to receive the compensating coils. While it is desirable to provide an effective orientation of the compensating coils, it is also important not to impair overall machine performance or unduly complicate the assemblage and disassemblage of the machine components.

It has been previously proposed to provide dynamoelectric machines with detachable pole shoes which contain slots for receiving the compensating coils. Exemplary of such a proposal are U.S. Rimkus Pat. No. 2,745,031, issued May 8, 1956 and U.S. Potter Pat. No. 2,679,607 issued May 25, 1954.

In Rimkus, the coil-receiving slots are intended to be open-ended and closed-sided. One assemblage problem posed by closed-sided slots is the difficulty involved in threading small-stranded conductors axially therethrough, an operation akin to attempting to push a rope from the end. In addition, Rimkus proposes that a groove be formed in the pole face for the reception of a cross-bar intended to serve in mounting the pole shoe to the yoke. Such a groove constitutes an interruption in the pole face and might tend to reduce the flux-conducting efficiency of the pole shoe.

The Potter patent proposes the use of a pole shoe having a main pole section and removable teeth which cooperate with the main pole section to define coil-receiving slots. The teeth are arranged to abut and support the coils. Inconveniences may arise in that removal of the excitation windings would require removal of the compensating windings, and vice-versa, in an arrangement where one set of mounting bolts functions to both secure the shoe sections together and attach the shoe to the yoke.

One serious problem associated with the presence of coils within pole slots concerns a tendency of the coils to oscillate, or vibrate, relative to the slot walls during machine operation. This behavior, besides being noisy, produces considerable wear on the coils and necessitates the use of relative thick insulation around the coils. Use of such insulation reduces the number of wires which can be placed in each slot and thereby places an unreasonable limitation on the compensating effect of the coil by limiting the number of ampereturns. Attempts have been made to eliminate this oscillation, as by inserting a non-magnetic, non-rigid compound between the slot walls and the coil. The effectiveness of this approach has been found to be of only temporary duration, however. Moreover, if a compound is used in slots which are slightly open at the pole face, parts of the compound could become detached, leaving depressions in the pole face and resulting in the introduction of loose debris within the machine.

Construction of the yoke portion of a dynamoelectric machine yoke may be conventionally accomplished by brazing together a series of laminated plates. This arrangement can be disadvantageous in that the brazing alloy typically occupies space which could otherwise be occupied by yet more plates, the addition of which would cut hysterisis losses and increase machine efficiency.

It is, therefore, a general object of the invention to provide novel methods and apparatus for minimizing or obviating problems of the sort previously discussed.

It is another general object of the invention to provide novel methods and apparatus for optimizing the performance of dynamoelectric machines.

It is a particular object of the invention to provide novel methods and apparatus for effectively resisting oscillation of compensating coils within dynamoelectric machine slots.

It is another object of the invention to provide a novel dynamoelectric machine characterized by simplified assemblage and disassemblage.

It is yet another object of the invention to provide a novel dynamoelectric machine which exhibits minimal hysterisis losses and maximum efficiency.

BRIEF SUMMARY OF THE PREFERRED EMBODIMENTS OF THE INVENTION

In accomplishing at least some of the foregoing objects, the present invention entails a dynamoelectric machine which includes stator and armature structures, a plurality of primary current windings, and a plurality of pole shoes carried preferably by the stator structure.

In one feature of the preferred embodiment, each pole shoe comprises base and tip sections which are detachably secured to each other and define slots for the reception of compensating coils. A plurality of strand-like elements are disposed within each slot and are tightly packed between the compensating coil and wall portions of the slot. A binder material, such as a resin for example, is poured into each strand-filled slot and allowed to harden so as to embed the strand-like elements therein. In this fashion, the resin-impregnated, strand-like elements function to restrain the compensating coils from oscillating within the slots.

In another feature of the preferred embodiment, the tip section of each pole shoe comprises a plurality of lamination plates. The plates include aligned apertures which define an opening extending through the tip section remote from a pole face that is defined by the outer edges of the tip plates. A connecting bar is disposed in the opening and has fasteners mounted on the ends thereof to firmly clamp the tip plates together Threaded bolts extend between the base and tip sections and are received within the connecting bar tc draw together the base and tip sections. The connect ing bar serves to draw the tip plates toward the base section in a generally uniform manner thereby prevent ing the occurrence of relative displacement of the tij plates. The fasteners at the ends of the connecting ba may comprise anchor brackets which are attached to the stator to assist in mounting the tip section to a yoke portion of the stator.

In another feature of the preferred embodiment, the yoke portion of the stator comprises a plurality of lamination plates which are disposed in mutually abutting relationship. Aligned recesses in the outer periphery of the yoke plates define a plurality of grooves around the yoke. These grooves receive attachment flanges which are welded to the outer edges of the yoke plates. In this manner, a maximum number of yoke plates per area may be provided.

The base section of each pole shoe may be detachably secured to the yoke by means of threaded connectors. Shoulder portions of the base section may be utilized to clamp the primary current windings to the yoke when the pole shoe is attached to the yoke by the threaded connectors. With such an arrangement, the pole shoe may be removed from the yoke to allow replacement of the current windings, without necessitating undue disturbance of the compensating coils.

THE DRAWINGS

Other objects and advantages of the present invention will become apparent from the subsequent detailed description thereof in connection with the accompanying drawings in which like numerals designate like elements and in which.

DETAILED DESCRIPTION OF THE PREFERRED EMBODIMENT OF THE INVENTION

Figure 1:
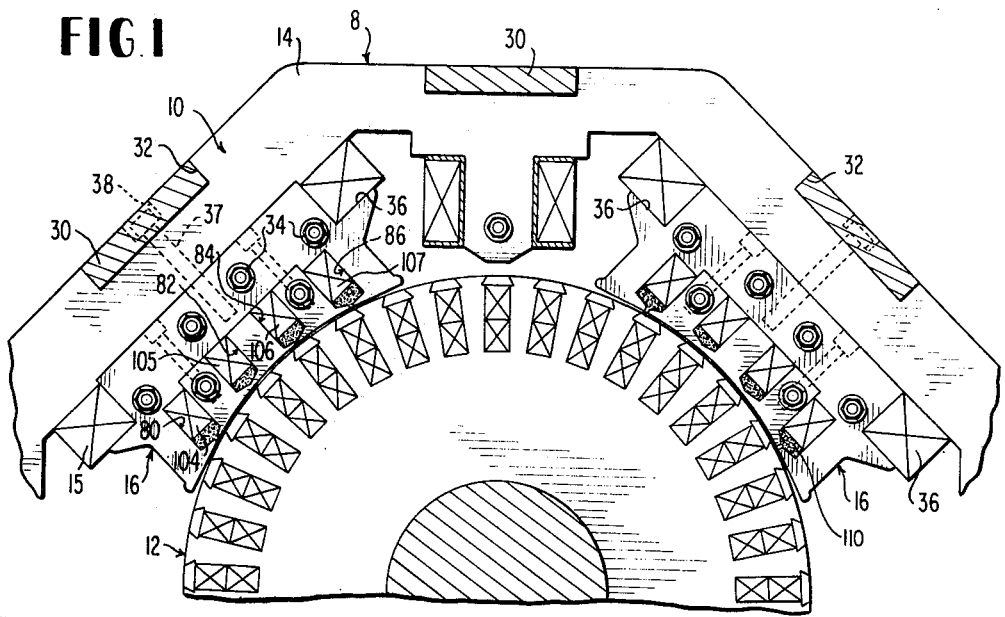
FIG. 1 is a digrammatical view of a portion of a dynamoelectric machine, partly in longitudinal section, in accordance with the invention.

A dynamoelectric machine 8 incorporating preferred forms of the present inventive features includes a stator field structure 10 enclosing a rotor armature structure 12. The armature 12 is journaled for rotation within the stator 10 and may be constructed in accordance with known principles.

The stator 10 includes a yoke 14 which carries a plurality of spaced salient pole shoes 16 disposed adjacent the periphery of the armature 12. Magnetic flux which is produced during machine operation is conducted between the stator and armature by the pole shoes 16. A system of primary electrical windings 15 is mounted on the stator to conduct current in the usual manner.

Each pole shoe 16 includes a base section 18 and a tip section 20. The shoe sections 18 and 20 are relatively separably connectable, and the base section 18 is separably connectable to the yoke, by means to be subsequently described.

Figure 3:
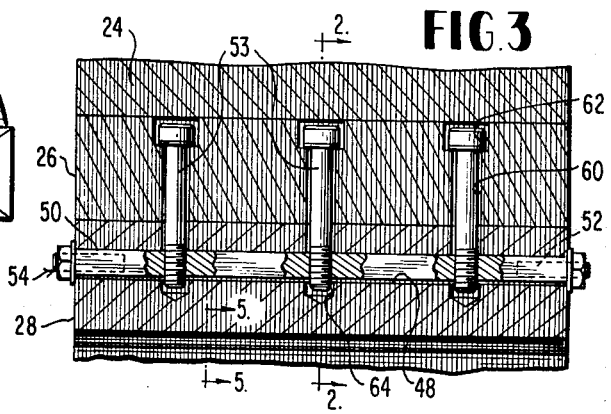
FIG. 3 is a cross-sectional view taken along line 3—3 in FIG. 2.
Figure 4:
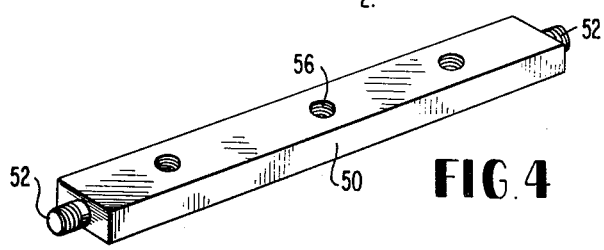
FIG. 4 is a perspective view of a connecting bar element according to the invention.

The yoke 14, the shoe base section 18, and the shoe tip section 20 are each of laminated construction, being respectively defined by a plurality of lamination plates 24, 26, and 28, as may be viewed in FIG. 3. The plates 24 forming the yoke are held together by a plurality of cross-flanges 30. These flanges 30 extend along the outer yoke periphery within grooves 32 formed by aligned recesses in the yoke plates 24. The flanges 30 may be welded to the yoke plates 24 to hold the plates in side-by-side abutting relationship.

The plates 26 forming the base section 18 are clamped together in side-by-side abutting relation by means of a plurality of clamping bolts 34, depicted in FIG. 1.

The manner in which the plates 28 of the tip section 20 are mounted constitutes a significant aspect of the invention and will be discussed subsequently in detail.

The base section 18 includes a pair of shoulder portions 36. These shoulders 36 serve to clamp the windings 15 to the yoke 14 when the base section is attached to the yoke by bolts 37. Aligned openings 38, 40, and 42 in the cross flanges 30, the yoke 14, and the base section 18 receive the bolts 37. The openings 42 are threaded to receive threaded ends of the bolts 37. The mounting end 44 of the base section 18 seats within a groove 46 of the yoke 14 to maintain the pole shoe in proper orientation.

If desired, the windings 15 may be wrapped around spools (not shown), with each spool being inserted onto a shoe base section.

The laminated plates 28 which form the tip section 20 are arranged in mutually abutting, side-by-side relationship. Aligned apertures in the plates 28 define an opening 48 extending through the tip section. Situated within this opening 48 is a connecting bar 50 which has threaded studs 52 projecting from opposite sides of the shoe tip 20. Fastener elements, such as washer and nut assemblies 54 for example, are coupled at the ends of the connecting bar to hold the plates 28 tightly together as a unit.

The connecting bar 50 includes a plurality of threaded holes 56 which are arranged to threadedly receive associated bolts 53 for securing the shoe sections 18 and 20 together. The shank and head sections of these bolts are respectively located within passages 60 and 62 formed in the base section 18. The threaded terminal ends of the bolts 53 are received within bores 64 formed in the shoe tip 20.

It should be understood that when the connecting bar 50 is drawn toward the base section 18 by the bolts 53, it will engage all of the tip plates 28 and draw them toward the base section 18 in a uniform manner. In this fashion, there will be no relative displacement of the tip plates 28.

Moreover, the connecting bar 50 is disposed remote from the pole face 70, defined by the outer edges of the plates 26 and 28, to avoid distorting the generally smooth configuration thereof.

It will be apparent that with the connecting bar 50, together with the fasteners 54, serving as a means for pressing the plates 28 together, the need for rivets or other coupling devices which might increase the size of the shoe tip will be eliminated.

Figure 6:
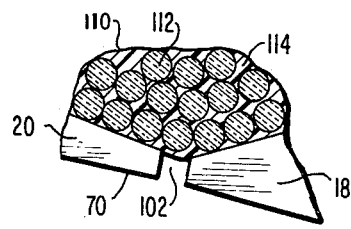
FIG. 6 is a cross-sectional view of a modified form of the machine in which supplemental connecting apparatus is to be employed in accordance with the invention.

In the event that relatively short pole shoes are employed, the mounting of the pole shoe may be accomplished by bracket assemblies, one of which being depicted in FIG. 6. The bracket assemblies are disposed at opposite ends of the connecting bar 50'. An anchor bracket 66 is mounted at each side of the shoe tip 20 and includes an aperture 67 which receives a threaded stud 52' of the connecting bar 50'. The nut and washer assembly 54' holds the anchor bracket 66 tightly against the shoe sections 18 and 20. The bracket 66 includes an outwardly extending leg 63. A fastener, such as a bolt 71, for example, passes through this leg to hold the bracket 66 to the yoke 14, and thus augment the connection between the pole shoe and the yoke and the connection between shoe sections 18 and 20.

The base section 18 includes a wall 76 that defines a cavity within which the tip section 20 is normally situated. The outer-most edges of the tip section 20 and the base section 18, when aligned, form the curved pole face 70. When these shoe sections 18 and 20 are coupled together, wall portions of these sections cooperate to form a plurality of slots 80, 82, 84, 86 for the reception of compensating coils. The front and intermediate sides of the slots 82 and 84 are defined by walls 88, 90, 92 on the shoe tip 20, while the back sides of these slots 82 and 84 are defined by the cavity-defining wall 76 of the shoe base 18.

Figure 2:
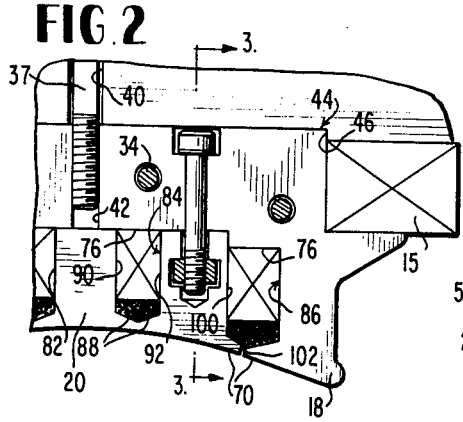
FIG. 2 is a cross-sectional view of a portion of a pole shoe and stator structure taken along line 2—2 in FIG. 3.

The slots 80 and 86 each have a back side, one intermediate side, and a front side portion formed by the cavity-defining wall 76 of the base 18 (FIG. 2). A wall 100 of the shoe tip 20 cooperates with the wall 76 to form the other intermediate side and the remainder of the front side of each slot 80 and 86. A small gap 102 is created at the front of slots 80 and 86 between the walls 76 and 100. This gap 102 may be on the order of one-sixteenth or one-thirty-second of an inch wide, for example.

AS will be apparent, with the shoe sections 18 and 20 in a detached condition, the slots 80, 82, 84, 86 will be open to facilitate convenient insertion of compensating coils 104, 105, 106, 107 therewithin. Reference may be had to the inventor's co-pending applicaton Ser. No. 237,576 filed Mar. 23, 1972 now U.S. Pat. No. 3,761,754 for a detailed description of such an arrangement. That co-pending application is incorporated herein by reference.

Figure 5:
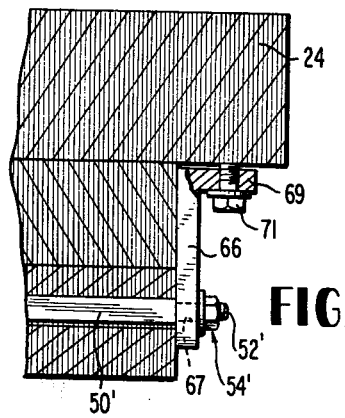
FIG. 5 is an enlarged cross-sectional view taken along the line 5—5 in FIG. 3, but not necessarily being to relative scale.

In order to firmly hold the compensating coils in place within their receiving slots, a rigid brace or support structure 110 is interposed between the slot walls and the coils. This bracing structure preferably comprises a cluster of strand-like elements 112 which are embedded within a hardened binder material 114 (FIG. 5).

The strands 112 are fabricated of a rigid non-metallic material such as glass, high temperature nylon, or asbestos fibers, for example. The binder material 114 preferably comprises a solventless resin, such as polyester, epoxy, or silicone. The polyester may be of the type sold by General Electric Co. under Designation No. 702. The silicone may be of the type sold by Dow Corning Corp. under Designation No. XR-4-3126. When epoxy is used, it is preferably precoated onto B-stage glass fiber strands, as are readily commercially available in rope-like form, approximately ⅜ inches in diameter, each strand being precoated and semi-cured with epoxy. These resins are typically capable of becoming bonded to the strands as well as the coil and the laminations forming the walls of the receiving slots.

With the compensating coils 104–107 positioned within their respective slots 80, 82, 84, 86 prior to tightening of the bolts 58, the recesses between the coils and slot walls may be filled with a cluster of strands 112. The clusters may be braided or twisted into rope-like members, or bound into bundles prior to insertion. The bolts 53 may be then tightened to tightly pack the strands between the slot walls and compensating coils. Strands may be added or removed as is necessary to properly orient the shoe sections in establishing a substantially smooth pole face 70.

Once a condition is established in which the strands 112 are tightly packed between the compensating coils and the slot walls, and the pole face-defining edges of the shoe sections are appropriately aligned, the shoe may be laid on-end to receive liquidified, i.e., pourable, resin 114, such as polyester or silicone, which is poured downwardly into the strand-containing recesses. By capillary action, the strands 112 conduct the resin downwardly therebetween. During hardening, the resin becomes bonded to the embedded strands, the coil and the laminations of the slot in the pole piece. In this fashion, the strands will be connected together in compacted relation between the compensating coils and slot walls, and thus capable of supporting these coils substantially against oscillatory movements relative to the slot walls. Consequently, the coil exterior will not be subjected to appreciable wear and thus will not require the provision of thick insulative jacketing.

The strands 112 tend to reinforce the resin 114 to resist fragmentation of the latter, which fragmentation could otherwise result in the formation of depressions in the pole face and the introduction of unwanted particles into the machinery.

In the event that the aforementioned rope-like elements of epoxy-coated glass fiber strands are employed as the brazing structure, the pouring step is omitted. Rather, after these members have been inserted within the slots, they are heated so as to cause the epoxy to liquify. Subsequent curing of the assembly causes the epoxy to become bonded to the coil, the lamination walls, and the strands.

Although a preferred form of the pole shoe has been described in which pairs of inner and outer slots are formed, it should be understood that any number of slots, configured in any suitable manner to receive a composition of strands and bonding agent, may be provided in accordance with the teachings of this invention.

It will be apparent that a pole shoe mounting arrangement has been provided in which the windings 15 may be easily replaced, as by loosening the bolts 34, without significantly disrupting the compensating coils 104–107, since the connection between shoe sections 18 and 20 will be maintained.

MACHINE ASSEMBLAGE

Yoke Assemblage

The yoke 14 is preferably assembled by disposing the plates 24 in tight side-by-side abutting relationship, inserting the attachment flanges 30 within the grooves 32, and welding the flanges to the plates. This arrangement avoids the loss of space occuring with known arrangements in which yoke plates are directly welded together by a filler metal disposed between adjacent plates.

POLE SHOE INTERCOUPLING

With the base and tip pole shoe sections 18 and 20 in an individually assembled condition, i.e., with the clamping bolts 34 tightened and with the fastener assemblies 54 tightened on the connecting bar 50, the compensating coils 104, 105, 106, and 107 are inserted into the associated open slots 80, 82, 84, and 86. Thus, the coils 105 and 106 are slipped into the tip section 20 through the open back side of the slots 82 and 84, while the coils 104 and 107 are inserted between the separated wall portions 76 and 100 of the slots 80 and 86.

The bolts 53 may then be inserted through the base 18 and into the connecting bar 50, and are tightened. Prior to final tightening, rope-like clusters of braided, twisted or bound bundles of strands 112 are inserted into the recesses between the compensating coils and their associated slot walls. When the bolts 53 are finally tightened, the strands become packed tightly together. In the event that there are too many or too few strands 112 disposed within a slot, rendering it difficult to align the outer edges of the shoe sections, the bolts 58 may be backed off slightly to permit removal or insertion of an appropriate number of strands.

It is noted that as the bolts 53 are tightened, the connecting bar 50 distributes the forces of the bolts 53 to all of the tip plates 28. Thus, the plates 28 are uniformly urged toward the base 18 without the occurrence of relative displacement therebetween and a resulting stepped formation in the tip section as might occur in the absence of this bar. The provison of plate-clamping fasteners 54 on the connecting bar eliminates the need for separate bolt or rivet elements which could increase the size of the pole shoe. Also, by disposing the opening 48 remote from the pole face, no gaps or interruptions will be formed therein to accomodate the bar.

The bolts 58 are tightened such that the strands 112 are tightly packed between the compensating coils and the slot walls, and the outer edges of the shoe section are aligned to form a generally smooth pole face 70. With the shoe being laid on-end such that the open-ended slots extend vertically, resin 114, in a generally liquid state, is poured into each slot. The resin is conducted downwardly by capillary action along the strands until it fills the space around, and embeds, the strands. Regarding slots 80 and 86 which include gaps 102, strands disposed within the gaps will be embedded within resin which enters the gaps. Upon hardening, the resin becomes bonded to the strands, the coil, and the laminations, thereby preventing relative movement between the strands. There is also an adherence of the resin with the walls of the slots, and the coil, thereby maintaining the resin-impregnated strands within the associated slots.

As previously noted, in the event that the aforementioned rope-like elements of epoxy-coated glass fiber strands are employed as the bracing structure, the pouring step is omitted. Rather, after these members have been inserted within the slots, they are heated so as to cause the epoxy to liquify. A suitable heating operation which may be employed is the well known vacuum pressure impregnation technique. Subsequent curing of the assembly causes the epoxy to become bonded to the coil, the lamination walls, and the strands.

During assemblage of the shoe sections, suitable structure may be disposed along the pole face to facilitate packing of the strands and pouring of the resin. The resin-impregnated strands within the gap serve to reinforce the resin and resist fragmenting of the resin during machine operation. This avoids the formation of significant depressions in the pole face and the presence of unwanted loose particles within the machine.

The pole shoes 16 are then coupled to the yoke by inserting the bolts 37 through the attachment flanges 30 and into the openings 42. Before tightening these bolts 37, the windings 15 are positioned between the yoke and the shoulders 36 of the pole shoe. The shoulders 36 serve to clamp the windings 15 in place when the bolts 37 are tigtened.

If it becomes desirable to replace excitation windings it is merely necessary to loosen the bolts 37, which may be accomplished without disturbing the compensating windings.

It is noted that if pole shoes of relatively short length are employed, it is advantageous to utilize the anchor bolts 66 to secure the pole shoes to the yoke.

Although the invention has been described in connection with a preferred embodiment thereof, it will be appreciated by those skilled in the art that additions, modifications, substitutions and deletions not specifically described may be made without departing from the spirit and scope of the invention as defined in the appended claims.

For example, as an alternative to the use of resin-impregnated twisted strands, rigid resin-impregnated bars having a wedge-shaped cross-section may be used to fill the void between the coil and slot walls in order to prevent coil oscillations.

What is claimed is:

1. A method of assembling a pole shoe for a dynamoelectric machine, said shoe including a base section and a tip section; said shoe sections being relatively separable and defining open-ended slot means for the reception of compensating coil means; said method including the steps of:

installing compensating coil means into said slot means;

inserting a plurality of strand-like elements into said slot means so that said strand-like elements lie between said compensating coils and walls of said slot means then clamping said base and tip sections together such that said compensator coil windings are braced by said strand-like elements, then inserting a liquid binder material into said slot means, and allowing said binder material to cure so as to bond said strand-like elements together and to said wall means defining said slot means.

2. A method according to claim 1 including the step of twisting said plurality of strand-like elements together prior to clamping said base and tip sections.

* * * * *